March 12, 1940.                G. B. BENTZ                2,193,527
                              BATHROOM STOOL
                       Filed June 23, 1938        3 Sheets-Sheet 1
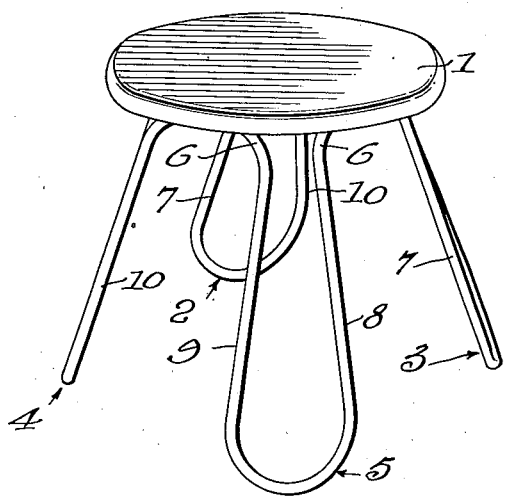
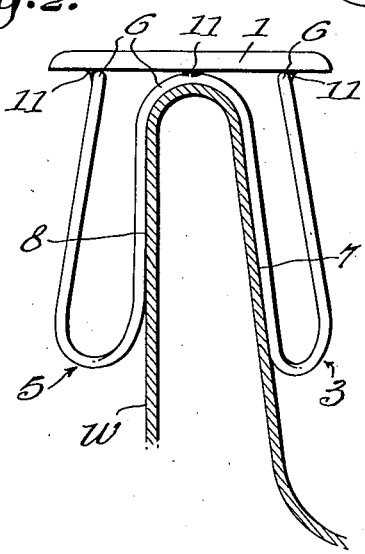
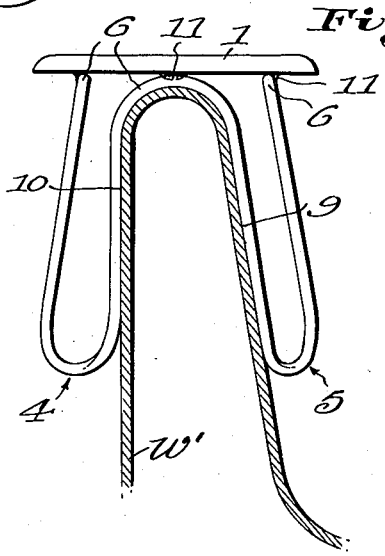
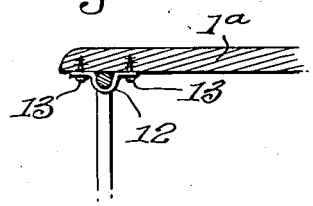
Inventor
George B. Bentz
By H. B. Wilson Yeo
Attorneys
WITNESS
H. Woodard March 12, 1940.  G. B. BENTZ  2,193,527
BATHROOM STOOL
Filed June 23, 1938  3 Sheets-Sheet 2
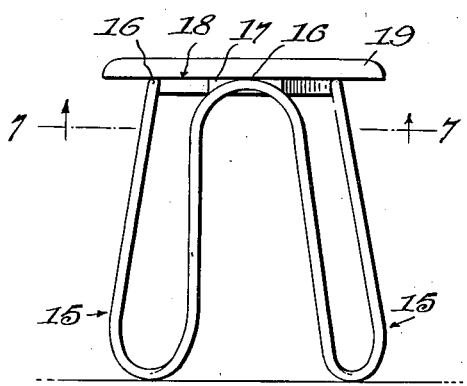
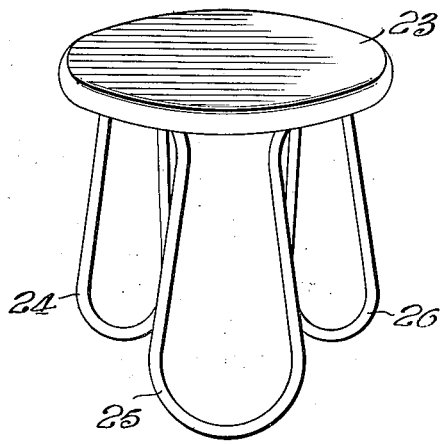
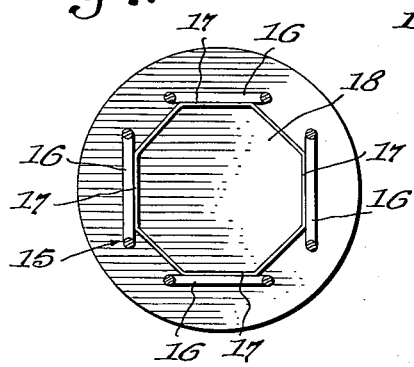
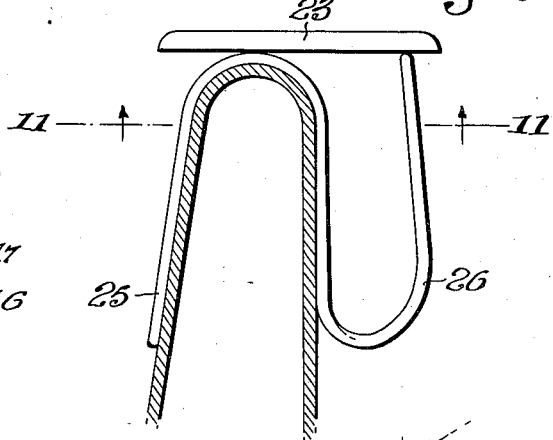
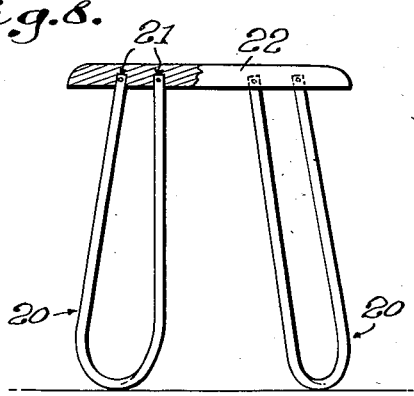
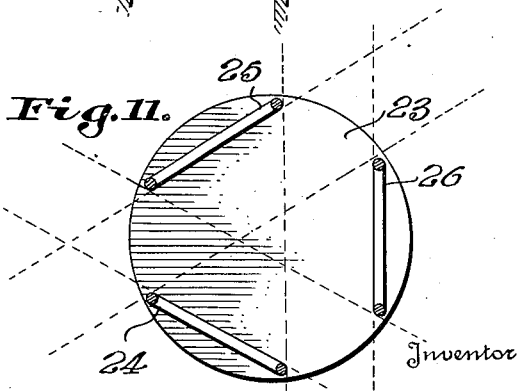
George B. Bentz March 12, 1940. G. B. BENTZ 2,193,527
BATHROOM STOOL
Filed June 23, 1938 3 Sheets-Sheet 3
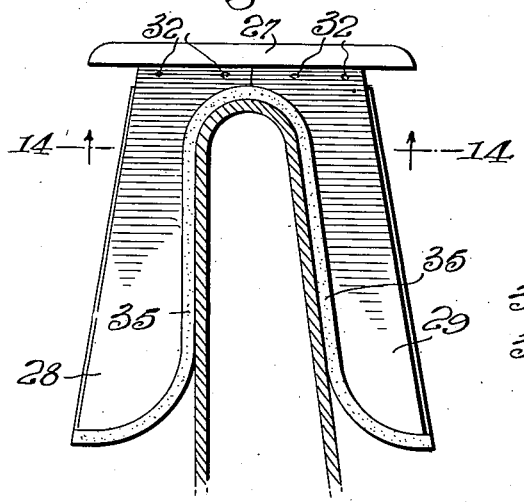
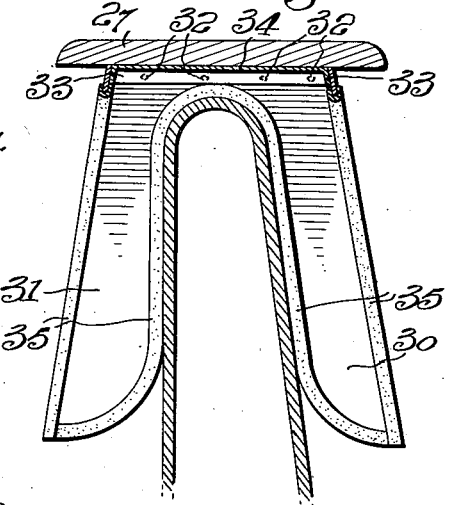
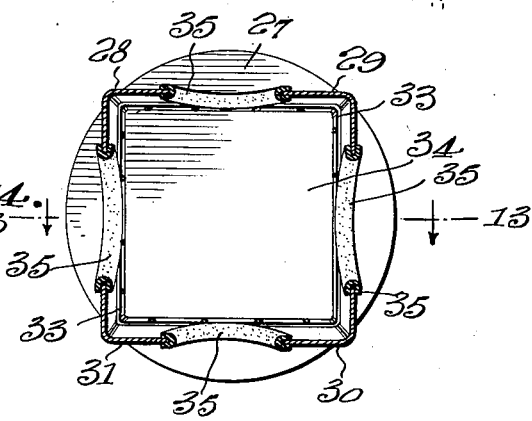
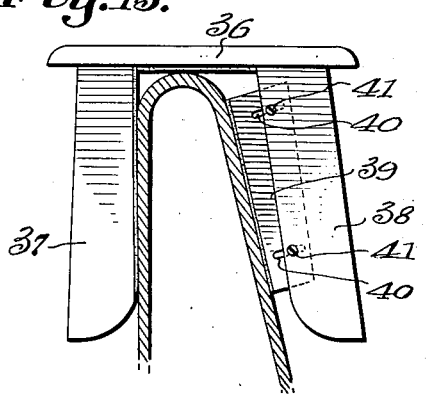
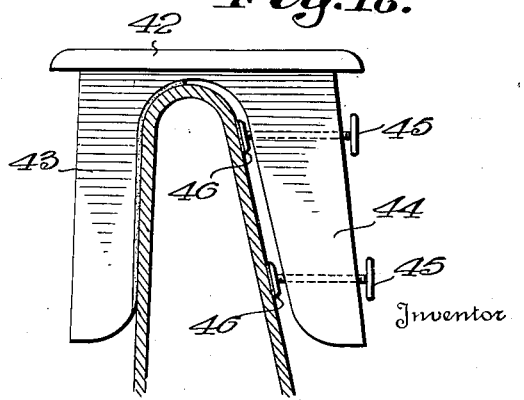
Inventor
George B. Bentz Patented Mar. 12, 1940

2,193,527

UNITED STATES PATENT OFFICE 2,193,527

BATHROOM STOOL

George B. Bentz, Bronx, N. Y.

Application June 23, 1938, Serial No. 215,473

7 Claims. (Cl. 155—36.5)

The invention aims to provide a new and improved stool which may be used to equal advantage upon a bathroom floor or straddling the side wall of a bathtub.

Another object is to provide a stool which may be placed astride a tub wall when turned to any of a plurality of positions, the construction being preferably such that the stool will fit tub side walls of different thicknesses when turned to said positions.

A still further object is the provision of a stool in which the seat thereof will be supported in a level manner whether the stool be engaged with a tub wall or placed upon the floor.

Yet another aim is to provide a simple, inexpensive and light stool which will be highly convenient, desirable, durable and safe.

With the foregoing in view, the invention resides in the novel subject matter hereinafter described and claimed, description being accomplished by reference to the accompanying drawings.

Figure 1 is a perspective view showing one form of the stool.

Figure 2 is a side elevation of the stool of Fig. 1 showing the same engaged with a relatively thin bathtub side wall.

Figure 3 is a side elevation at right angles to Fig. 2 showing the stool engaged with a relatively thick tub side wall.

Figure 4 is a detail sectional view showing one of the many ways in which the seat may be secured to the legs.

Figure 5 is a detail sectional view illustrating one of the many connections which may be employed between the ends of metal tubing when the latter is used for constructing the legs.

Figure 6 is a side elevation of a stool similar to that shown in Figs. 1 to 3 but illustrating the legs secured in a different manner to the seat.

Figure 7 is a horizontal sectional view on line 7—7 of Fig. 6.

Figure 8 is a side elevation partly broken away and in section showing a still further form of construction.

Figure 9 is a perspective view of a stool similar to that shown in Figs. 1 to 3 but having only three legs instead of four.

Figure 10 is a side elevation of the stool of Fig. 9 showing the same engaged with a tub side wall.

Figure 11 is a horizontal sectional view substantially on line 11—11 of Fig. 10 illustrating the manner in which the stool may be engaged with a tub side wall when turned to any of three different positions.

Figure 12 is a side elevation showing the stool having sheet metal legs.

Figure 13 is a sectional view through the upper portion of the stool of Fig. 12, on line 13—13 of Fig. 14.

Figure 14 is a horizontal sectional view substantially on line 14—14 of Fig. 12.

Figures 15 and 16 are side elevations showing provision for adjusting the stool to fit tub side walls of various thicknesses.

While a number of forms of construction have been illustrated and will be explained, it is to be understood that they do not constitute all of the forms which the invention may take, being illustrative rather than limiting.

In Figs. 1, 2 and 3, the numeral 1 denotes a horizontal seat of any suitable material but considered as of metal for the present disclosure. Four legs 2, 3, 4 and 5 are provided for this seat, said legs being formed by bending a single rod or length of tubing into substantially zig-zag shape, giving each leg substantially U-shape and connecting the upper ends of the legs by arched portions 6. The legs are of such length and spacing as to adapt the stool to either rest upon a floor or to straddle a tub side wall, and it will be obvious that with the stool turned to one position, two of its legs will be at the inner side of the tub wall and two at the outer side, and that when said stool is turned ninety degrees from the first position and engaged with a tub wall, two legs will also be at the interior of the tub and two at the exterior thereof. The construction is preferably such that when the stool is turned to one position (Fig. 2), its legs will snugly straddle a relatively thin tub side wall W, whereas when the stool is turned ninety degrees to the position of Fig. 3, said legs will snugly straddle a relatively thick side wall W'.

The legs 2 and 3 are provided with steeply inclined inner edges 7 to lie against the correspondingly inclined inner side of the tub wall W, and the legs 5 and 4 are provided with substantially vertical inner edges 8 to abut the outer side of said wall, these edges 7 and 8 being at such angles to the seat 1, as to support the latter in a level position when the stool is upon the wall W.

The legs 3 and 5 are provided with steeply inclined inner edges 9 to abut the inner side of the relatively thick side wall W', and the legs 2 and 4 are provided with inner edges 10 disposed about vertically to abut the outer side of said wall, said edges 9 and 10 being at such angles to the seat 1 that the latter will be supported in a level position when the stool is engaged with the wall W'. All of the legs are, of course, of such length that the seat 1 will be level when said legs rest upon a floor.

For illustrative purposes, I have shown the arched portions 6 welded at 11 to the seat 1 but they obviously could be connected thereto in other ways. For example, if the seat be of wood as shown at 1a in Fig. 4, bent metal straps 12 could extend under the arched portions 6 and could be secured to said seat by screws 13 or in any other preferred way.

When metal tubing is used, in constructing the legs, the ends of said tubing may be secured to each other in any suitable way, for instance, by welding, brazing or the like, with or without an insert 14 in the joint. When a rod is used in the formation of the legs, its ends may be brazed together, welded or otherwise secured.

In Figs. 6 and 7, 15 denotes a leg structure corresponding to that above described, the arched leg-connecting portions 16 thereof being welded against flanges 17 bent downwardly from a metal plate 18, the seat 19 of wood or metal being secured upon said plate in any suitable way.

In Fig. 8, legs 20 related with each other in substantially the same manner as the legs above described, are bent from four separate pieces of rod or tubing, each leg having a U-shape and having its upper ends secured suitably in sockets 21 in the seat 22.

In Figs. 9, 10 and 11, the seat 23 is provided with only three legs 24, 25 and 26, all of which may be formed from a single length of rod or tubing or in other suitable manner. The construction in connection with this stool is such that the same may be engaged with a tub wall when the stool is turned to any of three positions, and the legs are provided with inner opposed portions which solidly abut the tub wall, said portions being preferably so spaced that the stool in its three positions will snugly engage tub walls of three different thicknesses. The inner edges of the legs are at such angles to the seat 23 that the latter will be supported in a level position when the stool occupies any of the three positions to which it may be turned. The inner sides of the legs are of course disposed in substantially vertical planes at 60° to each other so that the inner side of any one leg may abut one side of a tub wall when one edge of each of the other two legs abuts the opposite side of said tub wall.

In Figs. 12, 13 and 14, the seat 27 is provided with four legs 28, 29, 30 and 31, all bent from sheet metal in such manner that each leg is of right angular shape in transverse section, the upper ends of said legs being spot-welded at 32 to a downturned flange 33 on a horizontal plate 34, the seat 27 being suitably secured upon said plate. The inner edges of the various legs are so shaped that their relation is the same as that existing between the inner edges of the legs shown in Figs. 1 to 3, and said edges are preferably provided with channel-shaped rubber edging 35 for tub protection purposes. It will also be understood that any of the legs above described or hereinafter described, may be provided with similar provision to prevent injuring the finish of the tub, if desired.

In Fig. 15, two of the legs for the seat 36 are denoted at 37 and 38 respectively, the inner edge of leg 37 being substantially vertical to abut the outer side of a tub wall while the leg 38 is provided with an adjustably mounted plate 39 to abut the inclined side of the tub wall, the adjustment being shown as consisting of slots 40 and bolts 41.

In Fig. 16, two of the legs for the seat 42 are shown at 43 and 44, leg 43 being provided with a substantially vertical inner edge to abut the outer side of a tub wall, whereas leg 44 is provided with two adjustable screws 45 having feet 46 on their inner ends to abut the inner side of said wall. Obviously, the devices of Figs. 15 and 16 may be adjusted to adapt the stool for use with tub walls of various thicknesses.

It will be seen from the foregoing that novel and advantageous constructions have been provided for carrying out the objects of the invention. Attention is again invited to the fact that not all possible forms of construction have been illustrated. Furthermore, variations may be made over the structures disclosed, within the scope of the invention is claimed.

I claim:

1. A bathtub stool comprising a horizontal seat, and legs of length and spacing to either rest on a floor or straddle a bathtub wall, said legs having opposed inner portions to abut the inner and outer sides of the tub wall, said portions being respectively steeply inclined and substantially vertical and at such angles to said seat as to support the latter in a level position when the stool is engaged with the tub wall, said legs being of such length as to also support the seat in a level position when the stool rests on a floor.

2. A bathroom stool comprising a seat, and legs of length and spacing to either rest on a floor or to straddle a bathtub wall, said legs being so related with said seat as to straddle a tub wall when the stool is turned to one position and to straddle a tub wall when the steel is turned to another position, said legs having portions disposed in steeply inclined planes to abut the inclined inner side of a tub wall and portions in substantially vertical planes to abut the substantially vertical outer side of a tub wall, said portions being so spaced and related with said seat as to solidly abut the tub wall and support the seat in a level manner when the stool is turned to either of the aforesaid positions.

3. A bathroom stool comprising a horizontal seat, and legs for said seat of length and spacing adapting them to either rest on a floor or to straddle a relatively thin bathtub wall when the stool is turned to one position or to straddle a relatively thick bathtub wall when said stool is turned to a second position, said legs having opposed portions to abut the inner and outer sides of a relatively thin tub wall and more widely spaced opposed portions to abut the inner and outer sides of the relatively thick wall.

4. A bathroom stool comprising a horizontal seat, and legs for said seat of length and spacing adapting them to either rest on a floor or to straddle a relatively thin bathtub wall when the stool is turned to one position or to straddle a relatively thick bathtub wall when said stool is turned to a second position, said legs having portions disposed in a steeply inclined plane to abut the steeply inclined inner side of the relatively thin tub wall, and portions in substantially a vertical plane to abut the substantially vertical outer side of said relatively thin wall; said legs also having portions corresponding to those aforesaid but more widely spaced to abut the sides of the relatively thick wall, said portions being at such angles to said seat as to support the latter in a level position when the stool is upon either wall.

5. A structure as specified in claim 1; said legs being all formed from a rod or tube bent to form said legs and to connect them with each other.

6. A stool comprising a horizontal seat and sheet metal legs therefor, said legs being of angular form in horizontal section providing each leg with two substantially vertical side members at an angle to each other, each of said side members of any leg being inwardly widened at its upper end and having said widened upper end abutting the adjacent inwardly widened upper end of the next adjacent leg, the side members at any side of the stool having inner edges so spaced as to abut the inner and outer sides of a double-wall bathtub wall when the legs are placed astride thereof, said widened upper ends of said side members having curved lower edges extending to said inner edges and providing arched formations to rest upon the rim of the tub wall.

7. A structure as specified in claim 6, said legs being of such length and said inner edges so related with said seat as to support the latter in a level position whether the stool be engaged with a tub wall or supported on a floor.

GEORGE B. BENTZ.